United States Patent
Vartanov

(10) Patent No.: US 11,692,232 B2
(45) Date of Patent: Jul. 4, 2023

(54) HIGH STRENGTH PRECIPITATION HARDENING STAINLESS STEEL ALLOY AND ARTICLE MADE THEREFROM

(71) Applicant: Gregory Vartanov, Oakville (CA)

(72) Inventor: Gregory Vartanov, Oakville (CA)

(73) Assignee: Gregory Vartanov, Oakville (CA)

( * ) Notice: Subject to any disclaimer, the term of this patent is extended or adjusted under 35 U.S.C. 154(b) by 146 days.

(21) Appl. No.: 16/555,102

(22) Filed: Nov. 25, 2019

(65) Prior Publication Data

US 2020/0080164 A1    Mar. 12, 2020

Related U.S. Application Data

(60) Provisional application No. 62/727,292, filed on Sep. 5, 2018.

(51) Int. Cl.
| | | |
|---|---|---|
| *C21D 6/02* | (2006.01) | |
| *C21D 6/00* | (2006.01) | |
| *C22C 38/50* | (2006.01) | |
| *C22C 38/46* | (2006.01) | |
| *C22C 38/44* | (2006.01) | |

(Continued)

(52) U.S. Cl.
CPC ............... *C21D 1/22* (2013.01); *B22F 1/142* (2022.01); *B22F 3/15* (2013.01); *B22F 3/24* (2013.01); *B22F 9/082* (2013.01); *B22F 10/20* (2021.01); *B22F 10/64* (2021.01); *B22F 10/66* (2021.01); *B33Y 70/00* (2014.12); *C21D 6/004* (2013.01); *C21D 6/02* (2013.01); *C22C 38/30* (2013.01); *C22C 38/44* (2013.01); *C22C 38/46* (2013.01); *C22C 38/50* (2013.01); *B22F 2301/35* (2013.01); *C21D 2211/001* (2013.01); *C21D 2211/008* (2013.01)

(58) Field of Classification Search
None
See application file for complete search history.

(56) References Cited

U.S. PATENT DOCUMENTS

| | | |
|---|---|---|
| 5,512,237 A | 4/1996 | Stigenberg |
| 5,533,982 A | 7/1996 | Rizk |
| | (Continued) | |

FOREIGN PATENT DOCUMENTS

| | | | |
|---|---|---|---|
| CN | 1214374 A | * | 4/1999 |
| EP | 0758025 A1 | | 2/1997 |
| | (Continued) | | |

OTHER PUBLICATIONS

JP 2013-127097 machine translation (Year: 2013).*

(Continued)

*Primary Examiner* — Paul A Wartalowicz
*Assistant Examiner* — Stephani Hill
(74) *Attorney, Agent, or Firm* — IP & T Group LLP

(57) ABSTRACT

High strength precipitation hardening stainless steel alloy is disclosed. The steel alloy has a composition by weight %, about: 30.0% max nickel (Ni), 0.0 to 15.0% cobalt (Co), 25.0% max chromium (Cr), 5.0% max molybdenum (Mo), 5.0% max titanium (Ti), 5.0% max vanadium (V), about 0.5% max lanthanum (La) and/or cerium (Ce), and in balance iron (Fe) and inevitable impurities. The steel alloy provides a unique combination of corrosion resistance, strength and toughness and is a material for aircraft landing gears and structures.

16 Claims, 10 Drawing Sheets

Transition metals by weight %:

| nickel (Ni) | cobalt (Co) | chromium (Cr) | molybdenum (Mo) | titanium (Ti) | vanadium (V) |
|---|---|---|---|---|---|
| 30.0% max | 0-15.0% | 25.0% max | 5.0% max | 5.0% max | 5.0% max |

Transition metals by weight %:

| manganese (Mn) | copper (Cu) | yttrium (Y) | zirconium (Zr) | niobium (Nb) | ruthenium (Ru) | rhodium (Rh) |
|---|---|---|---|---|---|---|
| 0-15.0% | 0-4.0% | 0-0.10% | 0-0.10% | 0-2.0% | 0-2.0% | 0-2.0% |
| palladium (Pd) | hafnium (Hf) | tantalum (Ta) | tungsten (W) | rhenium (Re) | iridium (Ir) | platinum (Pt) |
| 0-2.0% | 0-0.10% | 0-2.0% | 0-5.0% | 0-2.0% | 0-2.0% | 0-2.0% |

Non-metals by weight %:

| carbon (C) | nitrogen (N) | hydrogen (H) | oxygen (O) | sulphur (S) | phosphorus (P) |
|---|---|---|---|---|---|
| 0-0.10% | 0-0.10% | 0-0.01% | 0-0.01% | 0-0.01% | 0-0.015% |

Post-transition metals and metalloids by weight %:

| aluminum (Al) | gallium (Ga) | tin (Sn) | bismuth (Bi) | boron (B) | silicon (Si) | germanium (Ge) |
|---|---|---|---|---|---|---|
| 0-3.0% | 0-0.1% | 0-0.1% | 0-0.1% | 0-0.1% | 0-3.0% | 0-0.1% |

Alkaline earth metals by weight %:

| beryllium (Be) | magnesium (Mg) | calcium (Ca) | barium (Ba) |
|---|---|---|---|
| 0-2.0% | 0-1.0% | 0-0.50% | 0-0.50% |

Lanthanides by weight %:

| lanthanum (La) | cerium (Ce) | praseodymium (Pr) | neodymium (Nd) | gadolinium (Gd) |
|---|---|---|---|---|
| 0-0.50% | 0-0.50% | 0-0.50% | 0-0.50% | 0-0.50% |

Balance: iron (Fe)

(51) Int. Cl.

| | | |
|---|---|---|
| *C22C 38/30* | (2006.01) | |
| *C21D 1/22* | (2006.01) | |
| *B22F 3/15* | (2006.01) | |
| *B22F 3/24* | (2006.01) | |
| *B33Y 70/00* | (2020.01) | |
| *B22F 9/08* | (2006.01) | |
| *B22F 1/142* | (2022.01) | |
| *B22F 10/20* | (2021.01) | |
| *B22F 10/64* | (2021.01) | |
| *B22F 10/66* | (2021.01) | |

(56) References Cited

U.S. PATENT DOCUMENTS

| | | | |
|---|---|---|---|
| 5,681,528 A | 10/1997 | Martin | |
| 5,855,844 A * | 1/1999 | Martin | C22C 38/50 |
| | | | 420/53 |
| 6,238,455 B1 | 5/2001 | Brown | |
| 6,475,307 B1 | 11/2002 | Nystrom | |
| 6,630,103 B2 | 10/2003 | Martin | |
| 6,899,773 B2 | 5/2005 | Buck | |
| 7,879,159 B2 | 2/2011 | Wright | |
| 7,901,519 B2 | 3/2011 | Cao | |
| 8,663,403 B2 | 3/2014 | Chen | |
| 9,702,030 B2 | 7/2017 | Takaku | |
| 2008/0210344 A1 | 9/2008 | Holmberg | |
| 2008/0314480 A1* | 12/2008 | Wright | C22C 38/52 |
| | | | 148/326 |
| 2012/0241051 A1* | 9/2012 | Imaizumi | C21D 6/004 |
| | | | 148/326 |
| 2012/0321478 A1* | 12/2012 | Oikawa | C22C 38/44 |
| | | | 416/223 R |
| 2013/0220491 A1 | 8/2013 | Kosa | |
| 2014/0161658 A1 | 6/2014 | Wert | |
| 2015/0027598 A1 | 1/2015 | Seng | |
| 2015/0056093 A1* | 2/2015 | Sugiyama | C22C 38/54 |
| | | | 420/95 |
| 2016/0138145 A1* | 5/2016 | Valls | C22C 38/58 |
| | | | 420/79 |
| 2016/0319406 A1 | 11/2016 | Wert | |
| 2017/0002447 A1 | 1/2017 | Wert | |
| 2018/0320256 A1 | 11/2018 | Wert | |

FOREIGN PATENT DOCUMENTS

| | | | |
|---|---|---|---|
| EP | 1471158 A1 | 10/2004 | |
| JP | 11293410 A * | 10/1999 | |
| JP | 2013127097 A * | 6/2013 | |
| JP | 2014047409 A * | 3/2014 | |
| RU | 2025535 C1 * | 12/1994 | |
| SU | 1724723 A1 * | 4/1992 | |
| WO | WO-2009060900 A1 * | 5/2009 | C22C 38/02 |

OTHER PUBLICATIONS

CN 1214374 machine translation (Year: 1999).*
JP H11-293410 machine translation (Year: 1999).*
WO 2009-060900 machine translation (Year: 2009).*
JP 2014-047409 machine translation (Year: 2014).*
Kishkin et al. Distirbution of Group IV-VI and Villa transition elements between y- and y'—phases of heat-resistant nickel alloys. Izvestiya Akademii Nauk SSSR, Metally (1972), (1), 170-6. STN Abstract (Year: 1972).*
SU 1724723 machine translation (Year: 1992).*
RU 2025535 machine translation (Year: 1994).*
Benjamin T. Daymond, Nicolas Binot, Michael L. Schmidt, Steve Preston, Richard Collins, and Alan Shepherd: "Development of Custom 465 Corrosion-Resisting Steel for Landing Gear Applications", Journal of Materials Engineering and Performance, vol. 25(4) April 201, pp. 1539-1553.
Lei Zou, Cuiping Guo, Changrong Li, Zhenmin Du: "Experimental investigation and thermodynamic modeling of the Ni—Ti—V system", Calphad 64 (2019) 97-114.
H. Sugimura, Y. Kaneno, and T. Takasugi: "Alloying Behavior of Ni3M-Type Compounds with D0a Structure", Materials Transactions, vol. 52, No. 4 (2011) pp. 663-671.
Jialong Tian, WeiWang, M. Babar Shahzad, Wei Yan, Yiyin Shan, Zhouhua Jiang, and Ke Yang: "A New Maraging Stainless Steel with Excellent Strength-Toughness-Corrosion Synergy", Materials 2017, 10, 1293.
Custom 465® Stainless, Technical Datasheet, Carpenter Technology Corp., Edition Date: Feb. 27, 2014.
U.K Viswanathan, G.K. Dey, and M.K. Asundi: "Precipitation Hardening in 350 Grade Maraging Steel", Metallurgical Transactions A. vol. 24A, Nov. 1993, pp. 2429-2442.
Shunyu Liu, Yung C. Shin: "Additive manufacturing of Ti6Al4V alloy: A review", Materials and Design 164 (2019) 107552.
ATI A286 Iron-Based Superalloy, Technical Oatasheet, Allegheny Technologies Incorporated, Version 1, Apr. 17, 2012, pp. 1-9.

* cited by examiner

Transition metals by weight %:

| nickel (Ni) | cobalt (Co) | chromium (Cr) | molybdenum (Mo) | titanium (Ti) | vanadium (V) |
|---|---|---|---|---|---|
| 30.0% max | 0-15.0% | 25.0% max | 5.0% max | 5.0% max | 5.0% max |

Transition metals by weight %:

| manganese (Mn) | copper (Cu) | yttrium (Y) | zirconium (Zr) | niobium (Nb) | ruthenium (Ru) | rhodium (Rh) |
|---|---|---|---|---|---|---|
| 0-15.0% | 0-4.0% | 0-0.10% | 0-0.10% | 0-2.0% | 0-2.0% | 0-2.0% |
| palladium (Pd) | hafnium (Hf) | tantalum (Ta) | tungsten (W) | rhenium (Re) | iridium (Ir) | platinum (Pt) |
| 0-2.0% | 0-0.10% | 0-2.0% | 0-5.0% | 0-2.0% | 0-2.0% | 0-2.0% |

Non-metals by weight %:

| carbon (C) | nitrogen (N) | hydrogen (H) | oxygen (O) | sulphur (S) | phosphorus (P) |
|---|---|---|---|---|---|
| 0-0.10% | 0-0.10% | 0-0.01% | 0-0.01% | 0-0.01% | 0-0.015% |

Post-transition metals and metalloids by weight %:

| aluminum (Al) | gallium (Ga) | tin (Sn) | bismuth (Bi) | boron (B) | silicon (Si) | germanium (Ge) |
|---|---|---|---|---|---|---|
| 0-3.0% | 0-0.1% | 0-0.1% | 0-0.1% | 0-0.1% | 0-3.0% | 0-0.1% |

Alkaline earth metals by weight %:

| beryllium (Be) | magnesium (Mg) | calcium (Ca) | barium (Ba) |
|---|---|---|---|
| 0-2.0% | 0-1.0% | 0-0.50% | 0-0.50% |

Lanthanides by weight %:

| lanthanum (La) | cerium (Ce) | praseodymium (Pr) | neodymium (Nd) | gadolinium (Gd) |
|---|---|---|---|---|
| 0-0.50% | 0-0.50% | 0-0.50% | 0-0.50% | 0-0.50% |

Balance: iron (Fe)

Figure 1

Table 1

| | |
|---|---|
| Nitric Acid Moderate | Sulfuric Acid Restricted |
| Phosphoric Acid Restricted | Acetic Acid Restricted |
| Sodium Hydroxide from Moderate to Excellent | Salt Spray (NaCl) Good |
| Sea Water Moderate | Humidity Excellent |

Table 2

| | |
|---|---|
| Nitric Acid Good | Sulfuric Acid Moderate |
| Phosphoric Acid Moderate | Acetic Acid Good |
| Sodium Hydroxide Moderate | Salt Spray (NaCl) Good |
| Sea Water Moderate | Humidity Excellent |

Table 3

| |
|---|
| Corrosion resistance to atmospheres encountered in jet engine applications to at least 1300°F Excellent |
| Oxidation resistance for continuous service up to 1500°F High |

Figure 2

Transition metals by weight %:

| nickel (Ni) | chromium (Cr) | molybdenum (Mo) | titanium (Ti) | vanadium (V) |
|---|---|---|---|---|
| 5-15% | 8-15% | 5.0 %max | 5.0 %max | 5.0% max |

Transition metals by weight %:

| manganese (Mn) | copper (Cu) | tungsten (W) | yttrium (Y) | zirconium (Zr) | niobium (Nb) | tantalum (Ta) |
|---|---|---|---|---|---|---|
| 0-15.0% | 0-4.0% | 0-5.0% | 0-0.10% | 0-0.10% | 0-2.0% | 0-2.0% |

Non-metals by weight %:

| carbon (C) | nitrogen (N) | hydrogen (H) | oxygen (O) | sulphur (S) | phosphorus (P) |
|---|---|---|---|---|---|
| 0-0.10% | 0-0.10% | 0-0.01% | 0-0.01% | 0-0.01% | 0-0.015% |

Post-transition metals and metalloids by weight %:

| aluminum (Al) | boron (B) | silicon (Si) |
|---|---|---|
| 0-3.0% | 0-0.010% | 0-3.0% |

Alkaline earth metals by weight %:

| beryllium (Be) | magnesium (Mg) | calcium (Ca) | barium (Ba) |
|---|---|---|---|
| 0-2.0% | 0-1.0% | 0-0.10% | 0-0.10% |

Lanthanides by weight %:

| lanthanum (La) | cerium (Ce) |
|---|---|
| 0-0.10% | 0-0.10% |

Balance: iron (Fe)

Figure 3

Table 1

| weight % | Ni | Cr | Mo | Ti | V | Mn | Si | C |
|---|---|---|---|---|---|---|---|---|
| #1 | 12.0 | 12.50 | 1.10 | 1.60 | 0.50 | <0.10 | <0.10 | <0.02 |
| #2 | 12.0 | 12.50 | 1.10 | 0.40 | 1.60 | <0.10 | <0.10 | <0.02 |
| #3 | 12.0 | 12.50 | 1.10 | 1.10 | 1.10 | <0.10 | <0.10 | <0.02 |
| #4 | 12.0 | 12.50 | 1.10 | 1.60 | 1.10 | <0.10 | <0.10 | <0.02 |
| #5 | 12.0 | 12.50 | 1.10 | 1.60 | 1.60 | <0.10 | <0.10 | <0.02 |
| 465 | 11.00 | 11.58 | 0.95 | 1.61 | - | 0.01 | 0.01 | 0.005 |
| weight % | N | P | S | Ba | B | Ca | Ce | La |
| #1 | <0.01 | <0.015 | <0.01 | <0.01 | <0.005 | <0.01 | <0.01 | <0.01 |
| #2 | <0.01 | <0.015 | <0.01 | <0.01 | <0.005 | <0.01 | <0.01 | <0.01 |
| #3 | <0.01 | <0.015 | <0.01 | <0.01 | <0.005 | <0.01 | <0.01 | <0.01 |
| #4 | <0.01 | <0.015 | <0.01 | <0.01 | <0.005 | <0.01 | <0.01 | <0.01 |
| #5 | <0.01 | <0.015 | <0.01 | <0.01 | <0.005 | <0.01 | <0.01 | <0.01 |
| 465 | 0.0012 | 0.002 | 0.001 | - | - | - | - | - |

Balance: iron (Fe)

Table 2

| Alloy | UTS, ksi | YS, ksi | $K_{1c}$, ksi-sqrt(in) | CVN, ft-lb | El, % | RA, % | $K_{1scc}$, ksi-sqrt(in) |
|---|---|---|---|---|---|---|---|
| #1 | 270 | 244 | 70 | 20 | 11 | 52 | 60 |
| #2 | 220 | 205 | 110 | 36 | 14 | 65 | 85 |
| #3 | 262 | 236 | 82 | 26 | 12 | 56 | 65 |
| #4 | 290 | 250 | 60 | 16 | 10 | 42 | 36 |
| #5 | 305 | 265 | 50 | 10 | 8 | 34 | 25 |
| 465 | 260 | 240 | 90 | 16 | 12 | 57 | 82 |

Figure 4

Transition metals by weight %:

| nickel (Ni) | cobalt (Co) | chromium (Cr) | molybdenum (Mo) | titanium (Ti) | vanadium (V) |
|---|---|---|---|---|---|
| 5.0-15.0% | 10.0% max | 8.0-15.0% | 5.0% max | 5.0% max | 5.0% max |

Transition metals by weight %:

| manganese (Mn) | copper (Cu) | tungsten (W) | yttrium (Y) | zirconium (Zr) | niobium (Nb) | tantalum (Ta) |
|---|---|---|---|---|---|---|
| 0-15.0% | 0-4.0% | 0-5.0% | 0-0.10% | 0-0.10% | 0-2.0% | 0-2.0% |

Non-metals by weight %:

| carbon (C) | nitrogen (N) | hydrogen (H) | oxygen (O) | sulphur (S) | phosphorus (P) |
|---|---|---|---|---|---|
| 0-0.10% | 0-0.10% | 0-0.01% | 0-0.01% | 0-0.01% | 0-0.015% |

Post-transition metals and metalloids by weight %:

| aluminum (Al) | boron (B) | silicon (Si) |
|---|---|---|
| 0-3.0% | 0-0.010% | 0-3.0% |

Alkaline earth metals by weight %:

| beryllium (Be) | Magnesium (Mg) | calcium (Ca) | barium (Ba) |
|---|---|---|---|
| 0-2.0% | 0-1.0% | 0-0.10% | 0-0.10% |

Lanthanides by weight %:

| lanthanum (La) | cerium (Ce) |
|---|---|
| 0-0.10% | 0-0.10% |

Balance: iron (Fe)

Figure 5

Table 1

| weight % | Ni | Co | Cr | Mo | Ti | V | C |
|---|---|---|---|---|---|---|---|
| #6 | 11.0 | 3.0 | 12.50 | 1.80 | 1.60 | 1.10 | <0.02 |
| #7 | 8.50 | 7.50 | 12.50 | 1.80 | 1.60 | 1.10 | <0.02 |
| IMR | 7.45 | 7.16 | 12.53 | 3.14 | 1.75 | - | <0.0024 |

| weight % | N | P | S | Ba | B | Ca | Ce | La |
|---|---|---|---|---|---|---|---|---|
| #6 | <0.01 | <0.015 | <0.01 | <0.01 | <0.005 | <0.01 | <0.01 | <0.01 |
| #7 | <0.01 | <0.015 | <0.01 | <0.01 | <0.005 | <0.01 | <0.01 | <0.01 |
| IMR | <0.0026 | - | - | - | - | - | - | - |

Fe is in the balance

Table 2

| Alloy | UTS, ksi | YS, ksi | $K_{1c}$, ksi-sqrt(in) | CVN, ft-lb | El, % | RA, % | $K_{1scc}$, ksi-sqrt(in) |
|---|---|---|---|---|---|---|---|
| #6 | 295 | 250 | 60 | 13 | 10 | 42 | 35 |
| #7 | 305 | 265 | 50 | 10 | 8 | 34 | 25 |
| IMR | 285 | 245 | 75 | 10 | 10 | 43 | 54 |

Figure 6

Table 1

| Heat #8, weight % | | | | | | | | |
|---|---|---|---|---|---|---|---|---|
| Ni | Cr | Mo | Ti | V | C | N | P | S |
| 12.0 | 12.50 | 1.10 | 1.60 | 1.10 | <0.02 | <0.01 | <0.015 | <0.01 |
| Ca | Ba | Ce | Fe | Powder Particle Size: 400 Mesh | | | | |
| <0.01 | <0.01 | <0.01 | Balance | | | | | |
| Ti-6Al-4V, weight % | | | | | | | | |
| Al | V | Fe | O | C | N | H | Others | |
| 6.15 | 3.95 | 0.11 | 0.12 | 0.02 | 0.005 | 0.001 | <0.03 | |
| Ti Balance | Powder Particle Size: 400 Mesh | | | | | | | |

Table 2

| Process | SLM | |
|---|---|---|
| Material | Heat #8 | Ti-6Al-4V |
| Density ($\rho$), lb/in$^3$ | 0.281 | 0.160 |
| Modulus Elasticity (E), ksi | 31500 | 16650 |
| Specific Stiffness (E/$\rho$), ksi/lb/in$^3$ | 112100 | 104100 |
| Tensile Strength (UTS), ksi | 295 | 160 |
| Specific strength (UTS/$\rho$), ksi/lb/in$^3$ | 1050 | 1000 |
| Yield Strength (YS), ksi | 250 | 140 |
| Fatigue limits (S) at 10$^7$ cycles, ksi | >110 | 85 |
| Elongation (El), % | 10 | 10 |
| Reduction of Area (RA), % | 34 | 30 |
| Fracture Toughness ($K_{1C}$), ksi√in | 60 | 70 |
| Charpy v-notch Impact Toughness Energy (CVN), ft-lb | 20 | 14 |

Figure 7

Table 1

| Heat #9, weight % | | | | | | | | |
|---|---|---|---|---|---|---|---|---|
| Ni | Cr | Mo | Ti | V | C | N | P | S |
| 11.50 | 14.50 | 1.10 | 1.65 | 1.20 | <0.01 | <0.01 | <0.010 | <0.005 |
| Ca | Ba | Ce | La | Fe | *Powder Particle Size: 100 Mesh* | | | |
| <0.01 | <0.01 | <0.01 | <0.01 | Balance | | | | |
| Ti-6Al-4V, weight % | | | | | | | | |
| Al | V | Fe | O | C | N | H | Others | |
| 6.05 | 4.10 | 0.10 | 0.14 | 0.03 | 0.008 | 0.002 | <0.05 | |
| Ti | *Powder Particle Size: 100 Mesh* | | | | | | | |
| Balance | | | | | | | | |

Table 2

| Process | PM HIP | |
|---|---|---|
| Material | Heat #9 | Ti-6Al-4V |
| Density ($\rho$), lb/in$^3$ | 0.281 | 0.160 |
| Modulus Elasticity (E), ksi | 31200 | 16500 |
| Specific Stiffness (E/$\rho$), ksi/lb/in$^3$ | 111030 | 103125 |
| Tensile Strength (UTS), ksi | 290 | 155 |
| Specific strength (UTS/$\rho$), ksi/lb/in$^3$ | 1030 | 970 |
| Yield Strength (YS), ksi | 245 | 140 |
| Fatigue limits (S) at $10^7$ cycles, ksi | >110 | 85 |
| Elongation (El), % | 10 | 10 |
| Reduction of Area (RA), % | 34 | 30 |
| Fracture Toughness ($K_{1C}$), ksi$\sqrt{in}$ | 60 | 70 |
| Charpy v-notch Impact Toughness Energy (CVN), ft-lb | 18 | 12 |

Figure 8

Transition metals by weight %:

| nickel (Ni) | cobalt (Co) | chromium (Cr) | molybdenum (Mo) | titanium (Ti) | vanadium (V) |
|---|---|---|---|---|---|
| 15.0-30.0% | 0-15.0% | 12.0-25.0% | 5.0% max | 5.0% max | 5.0% max |

Transition metals by weight %:

| manganese (Mn) | copper (Cu) | tungsten (W) | yttrium (Y) | zirconium (Zr) | niobium (Nb) | tantalum (Ta) |
|---|---|---|---|---|---|---|
| 0-15.0% | 0-4.0% | 0-5.0% | 0-0.10% | 0-0.10% | 0-2.0% | 0-2.0% |

Non-metals by weight %:

| carbon (C) | nitrogen (N) | hydrogen (H) | oxygen (O) | sulphur (S) | phosphorus (P) |
|---|---|---|---|---|---|
| 0-0.10% | 0-0.10% | 0-0.01% | 0-0.01% | 0-0.01% | 0-0.015% |

Post-transition metals and metalloids by weight %:

| aluminum (Al) | boron (B) | silicon (Si) |
|---|---|---|
| 0-3.0% | 0-0.010% | 0-3.0% |

Alkaline earth metals by weight %:

| beryllium (Be) | magnesium (Mg) | calcium (Ca) | barium (Ba) |
|---|---|---|---|
| 0-2.0% | 0-1.0% | 0-0.10% | 0-0.10% |

Lanthanides by weight %:

| lanthanum (La) | cerium (Ce) |
|---|---|
| 0-0.10% | 0-0.10% |

Balance: iron (Fe)

Figure 9

Table 1

| weight % | Ni | Co | Cr | Mo | Ti | V | C | Mn | Si |
|---|---|---|---|---|---|---|---|---|---|
| #10 | 28.0 | - | 14.50 | 1.80 | 2.20 | 1.80 | <0.02 | <0.10 | <0.10 |
| #11 | 18.0 | 10.0 | 14.50 | 1.80 | 2.20 | 1.80 | <0.02 | <0.10 | <0.10 |
| A286 | 25.0 | - | 14.50 | 1.25 | 2.10 | 0.30 | 0.04 | 0.20 | 0.20 |
| weight % | Al | N | P | S | Ba | B | Ca | Ce | La |
| #10 | <0.10 | <0.01 | <0.015 | <0.005 | <0.01 | <0.01 | <0.01 | <0.01 | <0.01 |
| #11 | <0.10 | <0.01 | <0.015 | <0.005 | <0.01 | <0.01 | <0.01 | <0.01 | <0.01 |
| A286 | 0.15 | - | 0.015 | 0.002 | - | 0.006 | - | - | - |

*Fe is in the balance

Table 2

| Alloy | Test Temp., °F | UTS, ksi | YS, ksi | El, % | RA, % | CVN, ft-lb | Stress for Creep of 1% in 100 hrs, ksi |
|---|---|---|---|---|---|---|---|
| #10 | 70 | 180 | 120 | 22 | 40 | 60 | - |
|  | 800 | 172 | 104 | 18 | 30 | 48 | - |
|  | 1100 | 144 | 115 | 20 | 18 | 42 | 100 |
|  | 1300 | 105 | 95 | 10 | 11 | 40 | 50 |
| #11 | 70 | 190 | 130 | 20 | 35 | 54 | - |
|  | 800 | 184 | 113 | 16 | 25 | 42 | - |
|  | 1100 | 156 | 122 | 18 | 13 | 27 | 110 |
|  | 1300 | 115 | 105 | 8 | 10 | 35 | 50 |
| A286 | 70 | 145 | 95 | 24 | 45 | 64 | - |
|  | 800 | 138 | 72 | 18.5 | 35 | 51.5 | - |
|  | 1100 | 122 | 90 | 21 | 23 | 44 | 80 |
|  | 1300 | 86.5 | 86 | 11 | 10 | 44 | 35 |

Figure 10

HIGH STRENGTH PRECIPITATION HARDENING STAINLESS STEEL ALLOY AND ARTICLE MADE THEREFROM

RELATED APPLICATIONS

This application claims the benefit of priority of U.S. patent application No. 62/727,292 from Sep. 5, 2018, which is hereby incorporated by reference in its entirety.

FIELD OF THE INVENTION

The present invention is a high strength precipitation hardening stainless steel alloy that comprises three grades.

Grade #1 is the cobalt-free martensitic and martensitic-austenitic (semi-austenitic) steel alloy and it is applicable for high stressed articles such as aircraft landing gears and structures.

Grade #2 is the cobalt-bearing martensitic and martensitic-austenitic (semi-austenitic) steel alloy and it is applicable for high stressed articles such as aircraft landing gears and structures.

Grade #3 is the austenitic steel alloy and it is applicable for high temperature articles such as aircraft turbine components and other critical components, wherein high temperature strength, corrosion and oxidation resistance are required.

Other grades and applications can be derived from the high strength precipitation hardening steel alloy of the present invention.

BACKGROUND OF THE INVENTION

Steel alloys for aircraft landing gears and structures must have a combination of high strength, toughness, and fatigue resistance to provide the required operational properties to these components. The steel alloy must be plated to prevent corrosion or have sufficient resistance to various corrosion damages.

Aircraft turbine components are subjected to moderate strength at high temperature. The components such as turbine wheels, blades, frames, casing must have a combination of moderate strength, moderate creep strength, moderate stress rupture properties, and good corrosion and oxidation resistance at 1300-1350° F.

Precipitation hardening stainless steel alloys are the best materials to meet these requirements. There are several commercial martensitic, martensitic-austenitic, and austenitic high strength precipitation hardening stainless steel alloys such as 17-4 PH, 15-5 PH, 17-7PH, 13-8 PH, MLX17, MLX19, S240, Custom 455, Custom 465, 17-10 PH, A286 iron-base superalloy and others in the stainless steels market.

Many compositions have been developed to improve commercial high strength precipitation hardening stainless steel alloys. Featured compositions are described by the U.S. patent applications with publication No 20180320256, No 20160319406, No 20150027598, No 20140161658, No 20130220491, and No 20080210344 and the U.S. Pat. Nos. 9,702,030, 8,663,403, 7,901,519, 7,879,159, 6,630,103, 6,475,307, 6,238,455, 5,855,844, 5,681,528, 5,533,982, and 5,512,237.

The Custom 465 stainless steel alloy has the most attractive combination of mechanical properties and corrosion resistant properties among the martensitic-austenitic alloys (CarTech® Custom 465® Stainless; Technical Datasheet, Carpenter Technology Corporation, Edition Date Jun. 27, 2016, and Benjamin T. Daymond, Nicolas Binot, Michael L. Schmidt, Steve Preston, Richard Collins, and Alan Shepherd "Development of Custom 465 Corrosion-Resisting Steel for Landing Gear Applications", ASM International, published online Feb. 29, 2016).

A286 alloy is an iron-base austenitic alloy that possesses high strength at 70° F. and moderate strength and corrosion and oxidation resistance at temperature 1300° F. (ATI A286™ Iron-Based Superalloy; Technical Datasheet, Allegheny Technologies Incorporated, Version 1, Apr. 1, 2012).

The precipitation hardening stainless steel alloy of the present invention is different from the aforementioned commercial and developed precipitation hardening stainless steel alloys by one or more of the following features: alloying composition, microstructure, mechanical properties, corrosion and oxidation resistant properties.

SUMMARY OF THE INVENTION

A high strength precipitation hardening stainless steel alloy of the present invention ("the PHSS alloy") is primarily proposed as a material for aircraft applications such as high stressed landing gears and structures and aircraft turbine components.

Custom 465 stainless steel alloy ("the Custom 465 alloy") possesses the featured combination of high fracture toughness of 80-85 ksi-sqrt(in) and corrosion resistance in salt spray test; however its ultimate tensile strength of 255-260 ksi is not sufficient for the highly stressed aircraft landing gears.

Grades #1-2 of the PHSS alloy possesses an ultimate tensile strength (UTS) of 280 ksi and more and fracture toughness ($K_{1C}$) of 50 ksi-sqrt(in) and more. Additionally, the corrosion resistance of the PHSS alloy in salt spray test and its good pitting corrosion resistance allows for the avoidance of protecting plating for the landing gears.

The iron-base superalloy A286 ("the A286 alloy") possesses tensile strength of 140-145 ksi and Charpy v-notch impact toughness energy ("CVN") of 64-66 ft-lbs at 70° F., tensile strength of 85-87 ksi and CVN of 42-46 ft-lbs at 1300° F., and good corrosion and oxidation resistance; however, in some cases, its strength is not sufficient for high stressed aircraft turbine components.

Grade #3 of the PHSS alloy possesses high tensile strength of 180 ksi and more at 70° F. and moderate tensile strength of 105 ksi and more at 1300° F., and good corrosion and oxidation resistance.

The high mechanical and corrosion and oxidation resistance properties of Grades #1-3 of the PHSS alloy are achieved by its unique compositions and microstructures. Generally, the PHSS alloy has the Ni—Ti—V—Mo alloying composition and after hardening, its microstructure comprises nanometer size two and more intermetallic phases $Ni_3Ti$, $Ni_3V$, $(Ni, M1)_3(Ti, Me2)$, $(Ni, M1)_3(V, Me2)$, and other intermetallic phases and precipitates, wherein Me1 is one or more elements of the Ni-site substitution and Me2 are one or more elements of the Ti and V-sites substitutions; micron size precipitates of carbides, nitrides, and carbonitride; and martensite or martensite-austenite or austenite solid solution.

The unique composition and microstructure supply to the PHSS alloy mechanical and corrosion and oxidation resistance properties that exceed the properties of the commercial and new developed high strength precipitation hardening stainless steels and alloys.

BRIEF DESCRIPTION OF THE DRAWINGS

FIG. 1 shows the alloying composition of the PHSS alloy by weight %.

FIG. 2 shows Table 1 of the four-level comparative scale of corrosion resistance of Grades #1-2, Table 2 of the four-level comparative scale of Grade #3 of the PHSS alloy in the different mediums, Table 3 of high temperature corrosion and oxidation resistance of Grade #3.

FIG. 3 shows the alloying composition of the cobalt-free Grade #1 of the PHSS alloy of Example 1 by weight %.

FIG. 4 shows Table 1 of the alloying compositions of Heats #1-5 of Grade #1 of Example 1 and the Custom 465 alloy by weight % and Table 2 of the typical room temperature mechanical properties of the hardened by heat treatment Heats #1-5 of Grade #1 of Example 1 and the Custom 465 alloy.

FIG. 5 shows the alloying composition of the cobalt-bearing Grade #2 of the PHSS alloy of Example 2 by weight %.

FIG. 6 shows Table 1 of the alloying compositions of Heats #6-7 of Grade #2 of Example 2 and the IMR alloy by weight % and Table 2 of the typical room temperature mechanical properties of the hardened by heat treatment Heats #6-7 of Grade #2 of Example 2 and the IMR alloy.

FIG. 7 shows Table 1 of the alloying compositions of the powder of Heat #8 of Grade #1 of Example 3 and the powder of the Ti-6Al-4V alloy by weight % and Table 2 of the typical room temperature mechanical properties of the SLM built and hardened by heat treatment samples of the powder of Heat #8 and the SLM built and annealed samples of the powder of Ti-6Al-4V alloy.

FIG. 8 shows Table 1 of the alloying compositions of the powder of Heat #9 of Grade #1 of Example 4 and the powder of Ti-6Al-4V alloy by weight % and Table 2 of the typical room temperature mechanical properties of the consolidated by HIP and hardened by heat treatment samples of powder of Heat #9 and powder of Ti-6Al-4V alloy.

FIG. 9 shows the alloying composition of the austenitic Grade #3 of Example 5 of the PHSS alloy by weight %.

FIG. 10 shows Table 1 of the alloying compositions of Heats #10-11 of Grade #3 of Example 5 and the A286 alloy by weight % and Table 2 of the typical elevated temperature tensile strength, elongation and reduction of area, Charpy v-notch impact toughness properties, and the strength for creep of 1% in 100 hours of the hardened by heat treatment Heats #10-11 of Grade #3 of Example 5 and the A286 alloy.

DETAILED DESCRIPTION OF THE INVENTION

After hardening (strengthening), the PHSS alloy has a microstructure comprised a solid solution and precipitates.

The solid solution of Grade #1-2 comprises martensite or martensite and austenite in the different volume percent that depends on its chemical composition and heat treatment. The solid solution of Grade #3 comprises austenite.

The precipitates have different chemical compositions, crystal structures, temperatures of formation, and values of enthalpy of formation.

Micron size precipitates of carbides (Me)C, nitrides (Me)N, and carbo-nitrides Me(C, N), wherein Me is one or more of the elements Hf, Zr, Ta, Ti, Nb, V and other transition metals, Al, and Si. The precipitates are formed during solidification or high temperature hot working. Most of them have a cubic crystal structure similar to the NaCl structure with symbol B1 ("B1 crystal structure"), dissolution temperatures at 2200° F. and higher, and values of enthalpy of formation ("ΔHc") from −340 kJ/mol to −80 kJ/mol. It is necessary to note that crack initiation of the PHSS alloy is mostly associated with T-C-N precipitates.

The PHSS alloy is predominantly hardened by precipitation of the nanometer size (nano-scale) intermetallic phases. The term "predominantly" means that precipitation of the intermetallic phases supplies the highest strengthening for the PHSS alloy. For example, the PHSS alloy possesses hardness of HRC 34-36 after solution annealing, quenching, and refrigerating and its hardness is increased to HRC 53-55 after precipitation of the intermetallic phases.

Further, the precipitated intermetallic phases and other phases are designated by the common used chemical (stoichiometric) formulas.

The following binary (two-element) intermetallic phases ("binary phases") can be precipitated in the PHSS alloy.

The nanometer size precipitates of intermetallic phase with chemical formula $Ni_3Ti$ has a formation temperature of 850° F. and higher, dissolution temperature of 1800° F. and higher, ordered crystal structure with symbol $D0_{24}$ ("$D0_{24}$ crystal structure"), hexagonal close packed unit cell ("hcp"), and the calculated values of enthalpy of formation ("ΔHc") of −38.07 kJ/mol.

The nanometer size precipitate of intermetallic phase with chemical formula $Ni_3V$ has a formation temperature of 850° F. and higher, dissolution temperature of 1700° F. and higher, ordered crystal structure with symbol $D0_{22}$ ("$D0_{22}$ crystal structure"), face centered cubic unit cell ("fcc"), and ΔHc of −17.57 kJ/mol. Should be noted that intermetallic phase $Ni_2V$ with ΔHc of −22.14 kJ/mol can be precipitated as well; therefore, the intermetallic phase $Ni_xV$, wherein $2 \leq X \leq 3$ can be a part of in the PHSS (see Lei Zou, Cuiping Guo, Changrong Li, Zhenmin Du "Experimental investigation and thermodynamic modeling of the Ni—Ti—V system" Calphad, Volume 64, March 2019, Pages 97-114). Further, the $Ni_xV$ intermetallic phase is designated as $Ni_3V$.

The nanometer size precipitate of intermetallic phase with chemical formula $Ni_3Mo$ has a formation temperature of 900° F. and higher, dissolution temperature of 1800° F. and higher, ordered crystal structure with symbol $D0_A$ ("$D0_A$ crystal structure"), unit cell hcp or orthorhombic, and ΔHc of −7.53 kJ/mol. Intermetallic $Ni_3Mo$ phase can transform to the Mo-rich phase and to $Fe_2$(Mo, Me) hexagonal Laves phase at prolonged time of aging, wherein Me is one or more of transition metals.

Sufficient presence of alloying elements in the solid solution leads to significant transformations of the binary phases. The binary phases can be transformed to complex intermetallic phases ("complex phases") by substitution of atoms of: the Ni-site by one or more of Fe, Co, Cu, Mn and other transition metal atoms; the Ti, V, and Mo-sites by one or more of Hf, Zr, Ta, Ti, Nb, Mo, W, other transition metal atom, and post-transition metal Al and metalloid Si atoms. Transformations of the binary phases to the complex phases lead to changes of their crystal structures, unit cell, dissolution temperatures, and values of enthalpies of formation (see: H. Sugimura, Y. Kaneno, T. Takasugi "Alloying Behavior of $Ni_3M$-Type Compounds with D0a Structure", Materials Transactions, Vol. 52, No. 4 (2011) pp. 663 to 671 and H. Sugimura, Y. Kaneno, T. Takasugi "Alloying Behavior of $Ni_3Nb$, $Ni_3V$ and $Ni_3Ti$ compounds", Materials Science Forum, Vol. 654-656 pp. 440-443, June 2010). PHSS alloy can have the following precipitated complex nanometer size phases with chemical formulas: (Ni, Me1)$_3$(Ti, Me2), (Ni, Me1)$_3$(V, Me2), and (Ni, Me1)$_3$(Mo, Me2), wherein Me1 is one or more of Co, Fe, Cu, Mn, Re, Ir, Pd, other transition metals, and other elements for the Ni-site substitution and Me2 is one or more of V, Mo, Ti, Nb, Ta, W, Hf, Zr, Fe other transition metals, Al, and Si for the Ti, V, and Mo-sites substitutions. It should be noted that elements Fe, Mn, Cu, Si, Cr, W and other can be a substitution for the Ni-site and the Ti, V, and Mo-sites.

Precipitation of the complex phases supply to the PHSS alloy variations of its mechanical and corrosion resistant properties compared to the PHSS alloy with the precipitated binary phases. Therefore, precipitation of the complex intermetallic phases plays a crucial role for the PHSS alloy.

Table 1 shows several complex intermetallic phases that can be transformed from the binary phases by substitution of the Ni-site and Ti, V, and Mo-sites.

TABLE 1

| Binary (two-elements) phases | Substitution elements | | | | |
|---|---|---|---|---|---|
| | Fe | Co | Ti | V | Mo |
| Complex three and four-elements phases | | | | | |
| $Ni_3Ti$ | $(Ni,Fe)_3Ti$, $(Ni,Co)_3Ti$, $Ni_3(Ti,V)$, $Ni_3(Ti,Mo)$ $(Ni,Fe)_3(Ti,V)$, $(Ni,Fe)_3(Ti,Mo)$, $(Ni,Co)_3(Ti,V)$, $(Ni,Co)_3(Ti,Mo)$ | | | | |
| $Ni_3V$ | $(Ni,Fe)_3V$, $(Ni,Co)_3V$, $Ni_3(V,Ti)$, $Ni_3(V,Mo)$ $(Ni,Fe)_3(V,Ti)$, $(Ni,Fe)_3(V,Mo)$, $(Ni,Co)_3(V,Ti)$, $(Ni,Co)_3(V,Mo)$ | | | | |
| $Ni_3Mo$ | $(Ni,Fe)_3Mo$, $(Ni,Co)_3Mo$, $Ni_3(Mo,Ti)$, $Ni_3(Mo,V)$ $(Ni,Fe)_3(Mo,Ti)$, $(Ni,Fe)_3(Mo,V)$, $(Ni,Co)_3(Mo,Ti)$, $(Ni,Co)_3(Mo,V)$ | | | | |
| Complex five, six, and seven-elements phases | | | | | |
| $Ni_3Ti$ | $(Ni,Fe—Co)_3(Ti,V—Mo—Fe)$ | | | | |
| $Ni_3V$ | $(Ni,Fe—Co)_3(V,Ti—Mo—Fe)$ | | | | |
| $Ni_3Mo$ | $(Ni,Fe—Co)_3(Mo,Ti—V—Fe)$ | | | | |

Formation of the complex multi-elements intermetallic phases such as (Ni, Fe—Co-Me1)$_3$(Ti, V—Mo—Fe-M2), (Ni, Fe—CoM1)$_3$(V, Ti—Mo—FeM2), wherein Me1 and Me2 are one or more elements, including but not limited to transition metals, is proceeded by the similar substitutions (U. K. Viswanathan, G. K. Dey, and M. K. Asundi "Precipitation Hardening in 350 Grade Maraging Steel", Metallurgical Transactions A, Volume 24A, November 1993-2429).

Further, the intermetallic phases of the present invention are designated: $Ni_3Ti$, $Ni_3V$, and $Ni_3Mo$ for the binary (two elements) phases; (Ni, M11)$_3$(Ti, M21), (Ni, M12)$_3$(V, M22), and (Ni, M13)$_3$(Mo, M23), wherein M11, M12, and M13 is one or more elements of the Ni-site substitution and M21, M22, and M23 is one or more elements of the Ti, V, and Mo-sites substitutions, for the complex (tree and more elements) intermetallic phases. It should be noted that generally elements M11, M12, and M13 are different and elements M21, M22, and M23 are different as well; however, in some cases the elements M11, M12, and M13 can be the same, as can elements M21, M22, and M23. Further for simplification, the elements M11, M12, and M13 are designated as M1 and the elements M21, M22, and M23 are designated as M2.

The PHSS alloy is different from the commercial and new developed precipitation hardening stainless steel alloys because the PHSS alloy is predominantly hardened (strengthened) by precipitation of two or more following binary $Ni_3Ti$ and $Ni_3V$ and complex (Ni, M1)$_3$(Ti, M2), and (Ni, M1)$_3$(V, M2) intermetallic phases. Additionally, the PHSS alloy can be hardened (strengthened) by precipitation of the binary $Ni_3Mo$ and complex (Ni, M1)$_3$(Mo, M2) intermetallic phases and precipitation of Mo-rich phase as well as other phases.

The alloying composition of the PHSS alloy comprises the following key transition metals elements by weight %:

TABLE 2

| Ni | Co | Cr | Mo | Ti | V | Fe |
|---|---|---|---|---|---|---|
| 30% max | 0-15% | 25% max | 5.0% max | 5.0% max | 5.0% max | Balance |

In theory, the key transition metals elements and iron (Fe) in the balance are sufficient to form the PHSS alloy with high strength, good ductility and toughness, and good corrosion and oxidation resistance at room and elevated temperatures. However, the practice of manufacturing of the precipitation hardening stainless steels and alloys requires the additional (supplementary) elements.

The composition of the PHSS alloy can have one or more following additional elements.

Transition metals: manganese (Mn), copper (Cu), yttrium (Y), zirconium (Zr), niobium (Nb), ruthenium (Ru), rhodium (Rh), palladium (Pd), hafnium (Hf), tantalum (Ta), tungsten (W), rhenium (Re), iridium (Ir), and platinum (Pt), in some cases, can supply additional strengthening of a solid solution and precipitation of phases.

Non-metals: carbon (C), nitrogen (N), hydrogen (H), oxygen (O), sulphur (S), and phosphorus (P) are the harmful elements that deteriorate the corrosion resistant and mechanical properties.

Post-transition metals and metalloids elements: aluminum (Al) can form strengthening phases and gallium (Ga), tin (Sn), bismuth (Bi), boron (B), silicon (Si), and germanium (Ge), in some cases, can improve hot working, microstructure, mechanical and corrosion resistant properties.

Alkaline earth metals: beryllium (Be) can form strengthening phases, magnesium (Mg), calcium (Ca), and barium (Ba) can prevent formation different harmful inclusions.

Lanthanides: lanthanum (La), cerium (Ce) and praseodymium (Pr), neodymium (Nd), and gadolinium (Gd) can prevent formation different harmful inclusions; however, Ce and La are preferable elements.

The balance of the PHSS alloy is the transition metals element iron (Fe) and inevitable impurities.

FIG. 1 shows the alloying composition of the PHSS alloy.

An important feature of the PHSS alloy is the formation of its microstructure without detrimental precipitates having negative effects on corrosion and oxidation resistance and mechanical properties. Chemical composition, processing, and heat treatment allows for the avoidance or minimization of the formation of the following phases and carbides: delta-ferrite (δ-ferrite), sigma-phase (σ-phase), Laves phase, topologically-closed packed (TCP) phases such as $Fe_{36}Cr_{12}Mo_{10}$ (Chi), Fe—Cr—Mo (R), $Fe_7Mo_{13}Ni_4$ (Π) and other phases; chromium carbides $(Cr, Me)_{23}C_6$ and $(Cr, Me)_7C_3$.

The method of manufacturing of wrought articles of the PHSS alloy includes but not limited to the following steps.

Premium ingots of the PHSS alloy are melted by vacuum induction melting (VIM) followed by vacuum arc remelting (VAR) or electro-slag remelting (ESR). Also, the ingots of the PHSS alloy can be melted by argon oxygen decarburization (AOD) process followed by vacuum arc remelting (VAR) or electro-slag remelting (ESR). More than one VAR or ESR processes improves mechanical and corrosion resistant properties of the premium ingots.

The ingots are heated in a furnace and homogenize annealed at 2100-2300° F. for time sufficient to minimize the segregation of elements, then cooled with furnace, and air cooled.

Further, the ingots are heated to 1800-2300° F., and they are hot worked by forging, rolling, pressing, extrusion, preferably with a reduction ratio (ratio of the cross-sectional area before and after hot working) of 1:4 and more. The hot worked blanks such as bars, plates, and other can be hot pressed to obtain complex shaped articles followed by cooling in furnace and air cooling.

Finally, the blanks are annealed at 1200-1350° F. and air cooled followed by normalizing at 1600-2000° F. and the annealing. Further, the articles are rough machined and prepared for heat treatment. The articles can be cold formed by drawing or rolling prior to heat treatment. Finally, articles are hardened (strengthened) by heat treatment and then they are finish machined if it is necessary.

Another method of manufacturing of articles of the PHSS alloy is via the powder metallurgy consolidating processes; in this case the PHSS alloy is manufactured in powder form. The powder can be manufactured through atomization processes and other metal powder manufacturing processes.

The atomization processes includes but is not limited to liquid atomization, gas atomization, centrifugal atomization, water atomization, plasma atomization, electrode induction melting gas atomisation (EIGA), and other atomization processes.

Powder metallurgy consolidating processes includes but is not limited to additive manufacturing (AM), hot isostatic pressing (HIP), pressing and sintering followed by hot working, metal injection molding (MIM), electric current assisted sintering (EACS), and other commonly used and new designed metal powder consolidating processes. Other commercial and newly developed powder consolidated techniques can be applicable if they supply the necessary density and properties.

Another method of manufacturing of articles of the PHSS alloy is via the common-used casting processes.

Precision investment casting supplies to the articles excellent surface finish and high dimensional accuracy. The main disadvantage is the overall cost, especially for short-run productions.

Die castings are characterized by a very good surface finish and dimensional consistency. Sand casting has lower accuracy compared to other casting techniques; however cost of sand casting is very attractive.

Centrifugal casting is used to cast thin-walled cylinders.

Vacuum casting is applicable for manufacturing of aircraft landing gears and structures and it supplies accurate alloying composition and reduces inclusions such as oxides, nitrides, and hydrogen that significantly improve mechanical properties.

To improve microstructure by illuminating residual porosity, dissolving carbides, and recrystallization, castings can be subjected to the HIP process. Vacuum investment casting followed by the HIP process supplies to articles mechanical properties that are similar to the mechanical properties of the vacuum melted forgings.

Other processes such as a pseudo-HIP process, a cold isostatic pressing, cold and hot extrusion, and other processes for illuminating residual porosity of castings could be applicable as well.

Finally, articles are machined followed by hardening by heat treatment to form the desired precipitation particles and phases.

Hardening by heat treatment of articles from the PHSS alloy manufactured either from the melted ingots or the consolidated powder or the casting techniques includes but is not limited to the following steps.

Hardening by heat treatment of the martensitic and martensitic-austenitic Grades #1-2 of the PHSS alloy includes, but is not limited to the following steps.

Solution annealing consists of heating to temperature above the upper critical temperature ($A_{C3}$) and holding for time sufficient to complete austenite transformation and to dissolve the undesired precipitates followed by rapid cooling. The solution annealing is conducted at temperature from 1600° F. to 2000° F., preferably 1800° F. to 1900° F. The rapid cooling is performed by quenching in mediums such as salt bath, oil, polymer, gas, or others coolant that supply the desired cooling rate followed by air cooling. The solution annealing and rapid cooling can be performed more than one time to obtain the desired microstructure.

To control a microstructure, interrupted rapid cooling (martempering) or rapid cooling to a temperature above the martensite start temperature (austempering) can be applied.

Refrigerating (cold treatment) is performed after the solution annealing and cooling and followed by air warming. Refrigerating is performed at temperature sufficiently below the martensite start temperature ($M_S$) and the martensite finish temperature ($M_f$) from −40° F. to −120° F., preferably from −80° F. to −120° F. Refrigerating is conducted from 1 hour to 24 hours, preferably from 8 hours to 12 hours to perform full or partial transformation from austenite to martensite that depends on desired microstructure. If $M_S$ and $M_f$ are sufficiently high, hardening of the PHSS steel can be performed without refrigerating. If $M_S$ and $M_f$ are sufficiently low, the austenite to martensite transformation cannot be achieved even with refrigerating.

Also, refrigerating can improve microstructure by reducing segregation of alloying elements. After refrigerating, the treated articles undergo air warming. In some cases, the refrigerating has to be performed shortly after the quenching, preferably within 24 hours to avoid degradation of properties.

Age hardening (aging) is performed by heating to a temperature from 850° F. to 1250° F., preferably between 900° F. and 1150° F., for time sufficient to form the intermetallic phases and supply the desired combination of strength and toughness followed by rapid cooling or slow cooling (for example in air). Time of aging plays a crucial role in the precipitation of the intermetallic phases. Insufficient aging is prohibitive to the formation of precipitates and a prolonged period of aging leads to the degradation of mechanical properties; therefore, time of aging from 1 hour to 12 hours, preferably between 4 hours and 8 hours, supplies the desired combination of strength and toughness.

Aging at temperatures above 1150° F. promotes martensite to austenite transformation (reverted austenite) that increases volume of austenite. The increased volume of austenite supplies higher ductility and lower strength compared to the precipitation hardening at temperatures below 1150° F. Precipitation hardening for prolonged time of 20 hours and more promotes martensite to austenite transformation as well. Aging can be performed more the one time to obtain the desired combination of strength and toughness.

Hardening by heat treatment of the austenitic Grade #3 of the PHSS alloy includes but is not limited to the following steps.

Solution annealing comprises heating to high temperature and holding for time sufficient to homogenize the solid solution and dissolve the undesired precipitates followed by rapid cooling or slows cooling. The solution annealing is conducted at temperature from 1600° F. to 2000° F., preferably 1600° F. to 1800° F. The rapid cooling is performed by quenching in mediums such as salt bath, oil, polymer, gas, or others coolant that supply the desired cooling rate followed by air cooling. Usually, slow cooling is performed in air. The solution annealing and rapid cooling can be performed more than one time to obtain the desired microstructure.

Aging is performed by heating to a temperature from 1250° F. to 1450° F., preferably from 1300° F. to 1400° F., for prolonged time sufficient to form the desired intermetallic phases preferably from 10 hours to 24 hours, and slow cooling.

After hardening, the martensitic and martensitic-austenitic Grades #1-2 of the PHSS alloys possess high strength, high fatigue limits, moderate ductility and toughness, and corrosion resistance. The typical room temperature properties are as follows: hardness Rockwell scale C (HRC) of 53 and more, an ultimate tensile strength (UTS) of 280 ksi and more, an ultimate compressive strength of 280 ksi and more, a notch tensile strength (NTS) of 350 ksi and more, yield strength (YS) of 240 ksi and more, fatigue strength (limit) at $10^7$ cycles of 100 ksi and more, an elongation (El) of 8% and more, a reduction of area (RA) of 36% and more, a fracture toughness ($K_{1C}$) of 50 ksi-sqrt(in) and more, Charpy v-notch impact toughness energy (CVN) of 10 ft-lb and more, and a stress corrosion cracking in 3% NaCl solution and natural pH ($K_{1SCC}$) of 25 ksi-sqrt(in) and more. The general corrosion resistance approaches to the corrosion resistance of the 304 stainless grade. Salt spray test in 5% NaCl solution at 95° F. shows no rusting after 200 hours of exposure. FIG. 2 shows a table of four-level scale of corrosion resistance in the different mediums.

It should be noted that hardening of the martensitic-austenitic Grades #1-2 can be conducted by cold working as well. Solution annealing and cold working followed by aging results in a further increase in strength and hardness in comparison to solution annealing and direct aging. For example, cold drawing with 50% reduction results 15-25% increase of strength.

After hardening, the austenitic PHSS alloy (Grade #3) possess Rockwell hardness scale C of 38 and more at 70° F., an ultimate tensile strength of 180 ksi and more at 70° F. and 105 ksi and more at 1300° F., strength for creep of 1% in 100 hours at 1300° F. of 47 ksi and more, stress for rupture of 12% elongation in 100 hours at 1300° F. of 60 ksi and more, good high temperature corrosion and oxidation resistance.

It should be noted that hardening of Grade #3 can be conducted by cold working as well. Solution annealing and cold rolling followed by aging results in a further increase in strength and hardness in comparison to solution annealing and direct aging. For example, cold rolling with 50% reduction results 30-40% increase of strength.

The martensitic and martensitic-austenitic PHSS alloys are applicable not only for aircraft landing gears and structures. Other applications include but are not limited to bodies of bombs and missiles, artillery barrels, articles, wherein a combination of high strength, ductility, and corrosion and oxidation resistance are required.

The austenitic PHSS alloy is applicable not only aircraft turbine components. Other applications include but are not limited to: turbines for power generation, oil/gas upstream and downstream components, articles, wherein a combination of high strength and good corrosion and oxidation resistance at temperature up to 1300° F. are required.

Corrosion and oxidation resistance of Grade #3 at room and elevated temperatures is significantly better than Grades #1-2. FIG. 2 shows the four-level scale of corrosion resistance of Grades #1-2 and Grade #3 of the PHSS alloy in the different mediums.

The present invention is explained and illustrated more specifically by the following non-limited examples.

Example 1

Grade #1 is the cobalt-free martensitic or martensitic-austenitic PHSS alloy. FIG. 3 shows alloying composition of Grade #1 by weight %.

Premium ingots of Grade #1 are melted by VIM-VAR process; also, they can be melted by VIM-ESR or AOD-VAR processes. The ingots are homogenize annealed at 2200-2300° F., cooled with furnace, and air cooled. Further, the ingots are heated to 2100-2200° F., and forged to bars with the preferable reduction ratio of 1:4 and more. The bars are cooled in a furnace and air cooled. Finally, the bars are normalized at 1850-1950° F. and air cooled followed by annealing at 1200-1300° F. and air cooled.

Hardening of Grade #1 consists of: solution annealing at 1700-1950° F. for time sufficient to complete austenite transformation and to dissolve undesirable precipitates; rapid cooling by quenching in polymer, oil, gas, salt bath or other similar mediums and air cooling; optionally refrigerating at −60 to −120° F. for time sufficient to complete martensite transformation and air warming; aging at 850-1250° F. for time sufficient to precipitate desirable intermetallic and other phases, quenching in oil and air cooling or air cooling.

After the hardening, Grade #1 has microstructures comprised: nanometer size intermetallic phases; micron size (Ti, V, Me)—C—N, wherein Me one or more transition metals, carbide, nitride, carbonitride precipitates, martensitic or martensitic-austenitic solid solution; ASTM grain size (GS) of 5-6.

Grade #1 is predominantly hardened by precipitates comprising: two or more binary intermetallic phases $Ni_3Ti$, $Ni_3V$ and complex intermetallic phases $(Ni, Me1)_3(Ti, Me2)$, $(Ni, Me1)_3(V, Me2)$, wherein M1 being one or more elements of the Ni-site substitution and M2 being one or more elements of the Ti and V-site substitutions; other intermetallic phases and precipitates. The complex intermetallic phases comprise: $Ni_3(Ti, V)$, $Ni_3(Ti, Mo)$, $Ni_3(Ti, Mo, V)$, $(Ni, Fe)_3(Ti, V)$, $(Ni, Fe)_3Ti$, $(Ni, Fe)_3V$, $(Ni, Fe)_3(Ti, Mo)$, $(Ni, Fe)_3(V, Mo)$, $(Ni, Fe)_3(Ti, V, Mo)$. Other intermetallic phases and precipitates comprise: $Ni_3Mo$, $(Ni, Fe)_3Mo$, and Mo-rich phase.

Table 1 of FIG. 4 shows five alloying compositions (Heats #1-5) of Grade #1.

Lab scale ingots of Heats #1-5 are hot forged with a reduction ratio of 1:9 followed by normalizing at 1950° F. for 1 hour and air cooling and annealing at 1250° F. for 6 hours and air cooling. The test specimens are machined from the forged bars and hardened by: solution annealing at 1900° F. for 1 hour; quenching in oil and air cooling; refrigerating at −100° F. for 8 hours and air warming; aging at 950° F. for 4 hours and air cooling.

Table 2 of FIG. 4 shows the typical room temperature mechanical properties of Heats #1-5 and the Custom 465 alloy; wherein, UTS (ksi), YS (ksi), El (%), RA (%), CVN (ft-lb), $K_{1C}$ (ksi-sqrt(in)), and $K_{1SCC}$ (ksi-sqrt(in)) are an ultimate tensile strength, a yield strength, an elongation, a reduction of area, Charpy v-notch impact toughness energy, a fracture toughness, and a stress corrosion cracking.

Fatigue strength (limit) of Heats #1-5 is more than 100 ksi at $10^7$ cycles.

The general corrosion resistance of Grade #1 approaches the corrosion resistance of the 304 stainless grade. Salt spray test in 5% NaCl solution at 95° F. shows no rusting after 200 hours of exposure.

Heat #4 possesses the most attractive combination of strength, ductility, toughness, and corrosion resistance and it can be the main candidate as a material for aircraft landing gears and structures.

Example 2

Grade #2 is the cobalt-bearing martensitic or martensitic-austenitic PHSS alloy. FIG. 5 shows alloying composition of Grade #2 by weight %.

Premium ingots of Grade #2 are melted by VIM-VAR process; also, they can be melted by VIM-ESR or AOD-VAR processes. The ingots are homogenize annealed at 2200-2300° F., cooled with furnace, and air cooled. Further, the ingots are heated to 2100-2200° F., and forged to bars with the preferable reduction ratio of 1:4 and more. The bars are cooled in a furnace and air cooled. Finally, the bars are normalized at 1850-1950° F. and air cooled followed by annealing at 1200-1300° F. and air cooled.

Hardening of Grade #2 consists of: solution annealing at 1700-1950° F. for time sufficient to complete austenite transformation and to dissolve undesirable precipitates; rapid cooling by quenching in polymer, oil, gas, salt bath or other similar mediums and air cooling; optionally refrigerating at −60 to −120° F. for time sufficient to complete martensite transformation and air warming; aging at 850-1250° F. for time sufficient to precipitate desirable intermetallic and other phases, quenching in oil and air cooling or air cooling.

After the hardening, Grade #2 has microstructures comprised: nanometer size intermetallic phases; micron size (Ti, V, Me)—C—N carbide, wherein Me is one or more transition metals, nitride, carbonitride precipitates, martensitic or martensitic-austenitic solid solution; ASTM grain size (GS) of 5-6.

Grade #2 is predominantly hardened by precipitates comprising: two or more binary and complex intermetallic phases $Ni_3Ti$, $Ni_3V$ and (Ni, Me1)$_3$(Ti, Me2), (Ni, Me1)$_3$(V, Me2), wherein M1 being one or more elements of the Ni-site substitution and M2 being one or more elements of the Ti and V-site substitutions; other intermetallic phases and precipitates. The complex intermetallic phases comprise: $Ni_3$(Ti, V), $Ni_3$(Ti, Mo), $Ni_3$(Ti, Mo, V), (Ni, Fe)$_3$Ti, (Ni, Fe)$_3$V, (Ni, Fe)$_3$(Ti, V), (Ni, Fe)$_3$(Ti, Mo), (Ni, Fe)$_3$(V, Mo), (Ni, Co)$_3$(Ti, V), (Ni, Co)$_3$(Ti, Mo), (Ni, Co)$_3$(V, Mo), (Ni, Co)$_3$(Ti, V, Mo), (Ni, Fe, Co)$_3$(Ti, V, Mo). Other intermetallic phases and precipitates comprise: $Ni_3Mo$, (Ni, Fe)$_3$(Mo), (Ni, Fe, Co)$_3$Mo and Mo-rich phase.

Table 1 of FIG. 6 shows two alloying compositions of Heats #6-7 of Grade #2. Alloying composition of the IMR alloy is shown for a comparison in weight % (Jialong Tian, Wei Wang, M. Babar Shahzad, Wei Yan, Yiyin Shan, Zhouhua Jiang and Ke Yang: "A New Maraging Stainless Steel with Excellent Strength-Toughness-Corrosion Synergy"; Materials 2017, 10, 1293).

Lab scale ingots of Heats #6-7 are hot forged with a reduction ratio of 1:9 followed by normalizing at 1950° F. for 1 hour and air cooling and annealing at 1250° F. for 6 hours and air cooling. The test specimens are machined from the forged bars and they are hardened by: solution annealing at 1925° F. for 1 hour; quenching in oil and air cooling; refrigerating at −100° F. for 8 hours and air warming; aging at 925° F. for 4 hours, quenching in oil and air cooling.

Table 2 of FIG. 6 shows the typical room temperature mechanical properties of the hardened Heats #6-7 and the IMR alloy for a comparison, wherein UTS (ksi), YS (ksi), El (%), RA (%), CVN (ft-lb), $K_{1C}$ (ksi-sqrt(in)), and $K_{1SCC}$ (ksi-sqrt(in)) are an ultimate tensile strength, a yield strength, an elongation, a reduction of area, Charpy v-notch impact toughness energy, a fracture toughness, and a stress corrosion cracking.

Fatigue strength of Heats #6-7 at $10^7$ cycles exceeds 110 ksi.

The general corrosion resistance of Heats #6-7 approaches the corrosion resistance of the 304 stainless grade. Salt spray test of the composition #6-7 in 5% NaCl solution at 95° F. shows no rusting after 200 hours of exposure.

Disregarding the contribution of cobalt, it drastically increases the cost of the PHSS alloy; also, cobalt retards diffusion of elements that leads to their segregation.

Example 3

Titanium is a very attractive material for the airspace industry due to low density, high strength and excellent corrosion resistance. Powders of high strength titanium alloy are utilized for additive manufacturing (AM) of aerospace structural components. The built components have high specific stiffness of 104000-104400 (ratio of modulus elasticity of 16650-16700 ksi to density of 0.160-0.162 lbs/in$^3$) specific tensile strength of 900-1050 (ratio of tensile strength of 135-165 ksi to density of 0.160-0.162 lbs/in$^3$), fracture toughness of 50-80 ksi-sqrt(in), fatigue strength (limit) at $10^7$ cycles of 70-80 ksi, and good corrosion resistance in many aggressive mediums. However, cost of powders of the high strength titanium alloy makes the components expensive and limits their applications.

The articles made by AM from powder of the PHSS alloy have the specific stiffness of 104100-104500 (ratio of modulus elasticity of 31150-31250 ksi to density of 0.280-0.282 lbs/in$^3$) specific tensile strength of 1000-1100 (ratio of tensile strength of 290-300 ksi to density of 0.280-0.282 lbs/in$^3$), fracture toughness of 60-80 ksi-sqrt(in), fatigue strength at $10^7$ cycles of more than 100 ksi, and good corrosion resistance.

Table 1 of FIG. 7 shows alloying composition of the gas-atomized spherical morphology powder of the cobalt-free Grade #1 of the PHSS alloy (Heat #8) and the alloying composition of the powder of the Ti-6Al-4V alloy for a comparison by weigh %.

Test samples of the both powders are produced by selective laser melting (SLM). The samples made from the PHSS alloy are heat treated by: annealing at 1350° F. for 6 hrs and cooling with furnace; solution annealing at 1925° F. for 1 hour, oil quenching, and air cooling; aging at 925° F. for 4 hours, quenching in oil and air cooling.

The samples made from the Ti-6Al-4V alloy are heat treated by annealing at 1380° F. for 5 hrs and cooling with a furnace.

Table 2 of FIG. 7 shows the typical room temperature mechanical properties of the SLM samples of Heat #8 powder and SLM samples of the Ti-6Al-4V alloy powder (Shunyu Liu, Yung C. Shin "Additive manufacturing of Ti6Al4V alloy: A review", Materials and Design 164 (2019) 107552).

The elevated temperature specific strength of the powder of Heat #8 consolidated by SLM is higher than the powder of the Ti-6Al-4V alloy.

The built and heat treated samples made from powder of Heat #8 have slightly higher specific stiffness and specific strength than the as built and annealed samples made from powder of the Ti-6Al-4V alloy. It allows substituting the expensive the Ti-6Al-4V powder with the lower cost powder of Heat #8 without increasing the weight and decreasing stiffness, durability, and lifetime of the articles. The cost of HIP articles made from powder of the Ti-6Al-4V alloy is 40-100% more than the projected cost of the same weight SLM articles made from powder of Heat #8.

Corrosion resistance of articles built by AM from the powder of the PHSS alloy approaches to 304 stainless grade.

Additive manufacturing of the articles made from powder of the PHSS alloy reduces the energy consumption by 25% or more compared to the same weight articles made from powder of the Ti-6Al-4V alloy by the same process.

PHSS alloy reduces the aircraft manufacturers' titanium dependency from the monopoly of titanium suppliers on the world market.

Example 4

The near net shape (NNS) hot isostatic pressing of powder of metallic material (PM HIP) process allows for the manufacturing of various types of the complex shape products. The process supplies precise geometry of the products and properties that are close to the forged products. Cost of PM HIP products is generally higher than the cost of the forged products; however small batch of the large section products is economically feasible to produce by PM HIP rather than forging of the melted ingot. Manufacturing of the aircraft landing gears and structures by PM HIP of powder allows for high quality to be achieved at a reasonable cost.

Recently, PM HIP is extensively utilized for manufacturing aerospace components made from powders of titanium alloys; however, cost of components limits their applications. Utilizing the PHSS alloy powder of as an alternative of titanium alloy powder allows for the reduction of product costs without increasing weight and decreasing stiffness, durability, and lifetime.

Table 1 of FIG. 8 shows chemical compositions of the gas-atomized spherical morphology powder of the cobalt-free Grade #1 of the PHSS alloy (Heat #9) and the powder of the Ti-6Al-4V alloy for a comparison by weight %.

Test samples of both powders are produced by hot isostatic pressing (HIP). The samples of Heat #9 is hardened by: annealing at 1350° F. for 6 hrs and cooling with furnace; solution annealing at 1925° F. for 1 hour, oil quenching, and air cooling; refrigerating at −100° F. for 8 hrs and air warming, aging at 950° F. for 5 hrs and air cooling. The samples from the powder of the Ti-6Al-4V alloy are hardened by: solution annealing at 1750° F. for 10 min and water quenching; aging at 950° F. for 5 hrs.

Table 2 of FIG. 8 shows the typical room temperature mechanical properties of the samples of Heat #9 and the samples of the Ti-6Al-4V alloy.

The elevated temperature specific strength of the consolidated by HIP powder of Heat #9 is higher than the Ti-6Al-4V alloy.

The consolidated by HIP and hardened samples made from powder of Heat #9 have slightly higher specific stiffness and specific strength than the consolidated by HIP and hardened samples made from powder of the Ti-6Al-4V alloy. It allows for the substitution of the expensive the Ti-6Al-4V powder with the lower cost powder of Heat #9 without increasing the weight and decreasing stiffness, durability, and lifetime of the components. The cost of HIP articles made from powder of the Ti-6Al-4V alloy is 100-120% more than the projected cost of the same weight HIP articles made from powder of Heat #9.

Corrosion resistance of the articles made by HIP from powder of the PHSS alloy approaches that of the 304 stainless grade.

Additive manufacturing of the articles made from powder of the PHSS alloy reduces the energy consumption by 25% or more compared to the same weight articles made from powder of the Ti-6Al-4V alloy by the same process.

The PHSS alloy reduces the aircraft manufacturers' titanium dependency from the monopoly of titanium suppliers on the world market.

Example 5

Grade #3 is the austenitic grade of the PHSS alloy. Grade #3 is applicable for high temperature applications such as aircraft turbine components and other critical components, wherein high temperature strength and high temperature corrosion and oxidation resistance are required. FIG. 9 shows alloying composition of Grade #3 by weight %.

Premium ingots of Grade #3 are melted by VIM-VAR process; also, they can be melted by VIM-ESR or AOD-VAR processes. The ingots are homogenize annealed at 2100-2200° F., cooled with furnace, and air cooled. Further, the ingots are hot worked at 1900-2150° F. The bars are cooled in a furnace and air cooled. Finally, the bars are normalized at 1800-1900° F. and air cooled.

Hardening of Grade #3 consists of: solution annealing at 1600-1900° F. for time sufficient to homogenize solid solution and dissolve undesired precipitates and rapid or slow cooling; aging at 1250-1450° F. for 10-24 hours and air cooling.

After the hardening, Grade #3 has microstructures comprised: nanometer size intermetallic phases; micron size (Ti, V, Me)—C—N carbide nitride, carbo-nitride precipitates, wherein Me is one or more transition metals; austenite solid solution; ASTM grain size (GS) of 4-5.

Grade #3 is predominantly hardened by precipitates comprising: two or more binary and complex intermetallic phases $Ni_3Ti$, $Ni_3V$ and $(Ni, Me1)_3(Ti, Me2)$, $(Ni, Me1)_3(V, Me2)$, wherein M1 being one or more elements of the Ni-site substitution and M2 being one or more elements of the Ti and V-site substitutions; other intermetallic phases and precipitates. The complex intermetallic phases comprise: $Ni_3(Ti, V)$, $Ni_3(Ti, Mo)$, $Ni_3(Ti, Mo, V)$, $(Ni, Fe)_3Ti$, $(Ni, Fe)_3V$, $(Ni, Fe)_3(Ti, V)$, $(Ni, Fe)_3(Ti, Mo)$, $(Ni, Fe)_3(V, Mo)$, $(Ni, Co)_3(Ti, V)$, $(Ni, Co)_3(Ti, Mo)$, $(Ni, Co)_3(V, Mo)$, $(Ni, Co)_3(Ti, V, Mo)$, $(Ni, Fe, Co)_3(Ti, V, Mo)$. Other intermetallic phases and precipitates comprise: $Ni_3Mo$, $(Ni, Fe)_3(Mo)$, $(Ni, Fe, Co)_3Mo$ and Mo-rich phase.

Table 1 of FIG. 10 shows two alloying compositions of Grade #3, Heats #10-11, and the alloying composition of the A286 alloy for a comparison in weight %.

Lab scale ingots of Heats #10-11 are hot forged with a reduction ratio of 1:4 followed by normalizing at 1900° F. for 1 hour and air cooling. The test specimens are machined from the forged bars and they are hardened by: solution annealing at 1800° F. for 1 hour, oil quenching, and air cooling; aging at 1325° F. for 16 hours and air cooling.

Table 2 of FIG. 10 shows the typical elevated temperature mechanical properties and stress for creep of 1% in 100 hrs of the hardened Heats #10-11 and the A286 alloy for a comparison, wherein UTS (ksi), YS (ksi), El (%), RA (%), CVN (ft-lb), are an ultimate tensile strength, a 0.2% offset yield strength, an elongation, a reduction of area, and Charpy v-notch impact toughness energy.

Grade #3 possesses excellent corrosion resistance to atmospheres encountered in the jet engine applications to at least 1300° F. and oxidation resistance for continuous service up to 1500° F.

Combination of high strength and good elevated temperatures corrosion and oxidation resistance makes Grade #3 applicable for the aircraft turbine components such as wheels and blades, frames, and casings.

Although only several alloying compositions have been described, it is obvious that other compositions can be derived from the presented description without departing from the spirit thereof.

What I claim is new is:

1. A stainless steel alloy comprising, by weight %:
 more than 14% and less than 30% nickel (Ni),
 about 0%-10.0% cobalt (Co),
 about 8.0% and less than 15% chromium (Cr),
 about 5.0% max molybdenum (Mo),
 more than 1.0% and less than 5.0% titanium (Ti),
 more than 1.0% and less than 5.0% vanadium (V),
 about 0%-1.0% silicon (Si),
 about 0%-1.5% manganese (Mn),
 about 0%-less than 0.1% aluminum (Al),
 and the balance is iron (Fe) and inevitable impurities,
 wherein the stainless steel alloy comprises a high strength precipitation hardened stainless steel alloy comprising one or more intermetallic phases of Ni3Ti, Ni3(Ti, V), and (Ni, M11)3(Ti, M21) and one or more intermetallic phases of Ni3V, Ni3(V, Ti), and (Ni, M12)3(V, M22), wherein M11 and M12 are one or more elements of Fe, Co, Cu, and Mn for Ni-site substitution, and wherein M21 is one or more elements of V, Mo, Nb, Fe, Ta, W and Si for Ti-site substitution and M22 are one or more elements of—Ti, Mo, Nb, Fe, Ta, W and Si for V-site substitution.

2. The stainless steel alloy of claim 1, comprising one or more elements, by weight %:
 about 0%-2.0% copper (Cu),
 about 0%-1.0% niobium (Nb),
 about 0%-1.0% tantalum (Ta),
 about 0%-2.0% tungsten (W),
 about 0%-0.03% carbon (C),
 about 0%-0.03% nitrogen (N),
 about 0%-0.01% sulphur (S),
 about 0%-0.015% phosphorus (P),
 about 0%-0.01% boron (B),
 about 0%-0.01% magnesium (Mg),
 about 0%-0.01% calcium (Ca),
 about 0%-0.01% lanthanum (La),
 and about 0%-0.01% cerium (Ce).

3. The stainless steel alloy of claim 1, wherein said steel alloy has precipitates comprising one or more intermetallic phases of Ni3Mo, (Ni, M13)3(Mo, M23), and Mo-rich phase, wherein M13 is one or more elements of Fe, Co, Cu, and Mn of Ni-site substitution and M23 is one or more elements of V, Ti, Nb, Ta, W, Fe, and Si of Mo-site substitution.

4. The stainless steel alloy of claim 1, wherein making of said steel alloy comprising the steps of vacuum melting ingot, hot working, and hardening, and wherein said steel alloy has, in combination, hardness about HRC 53 and more, a ultimate tensile strength about 280 ksi and more, a yield strength about 230 ksi and more, a fatigue strength about 100 ksi and more at 10 million cycles, a fracture toughness about 55 ksi-sqrt(in) and more, a Charpy v-notch impact toughness energy about 10 ft-lb and more, and a corrosion resistance in salt spray test in 5% NaCl solution at 95° F. for more than 200 hours of test duration per ASTM Standard Test Procedure B 117-18, and wherein said steel alloy is a material for aircraft landing gears and structures.

5. The stainless steel alloy of claim 1, wherein said steel alloy has precipitates comprising carbides (Me)C, nitrides (Me)N, and carbo-nitrides Me(C, N), wherein Me is one or more of the elements Zr, Ta, W, Ti, Nb, and V.

6. The stainless steel alloy of claim 1, wherein said stainless steel alloy is hardened by age hardening, wherein said age hardening is performed more than one time.

7. A stainless steel alloy comprising, by weight %:
 more than 14% and less than 30% nickel (Ni),
 about 0-10.0% cobalt (Co),
 about 8.0 and less than 15.0% chromium (Cr),
 about 5.0% max molybdenum (Mo),
 more than 1% and less than 3.0% titanium (Ti),
 more than 1% and less than 3.0% vanadium (V),
 about 0%-1% manganese (Mn),
 about 0%-1% copper (Cu),
 about 0%-0.01% zirconium (Zr),
 about 0%-1.0% niobium (Nb),
 about 0%-0.03% carbon (C),
 about 0%-0.03% nitrogen (N),
 about 0%-0.01% sulphur (S),
 about 0%-0.015% phosphorus (P),
 about 0 and less than 0.1% aluminum (Al),
 about 0%-0.01% boron (B),
 about 0%-1.0% silicon (Si),
 about 0%-0.01% magnesium (Mg),
 about 0%-0.01% calcium (Ca),
 about 0%-0.01% lanthanum (La),
 about 0%-0.01% cerium (Ce), and
 the balance is iron (Fe) and inevitable impurities,
 wherein the stainless steel alloy comprises a high strength precipitation hardened stainless steel alloy comprising one or more intermetallic phases of Ni3Ti, Ni3(Ti, V), and (Ni, M11)3(Ti, M21) and one or more intermetallic phases of Ni3V, Ni3(V, Ti), and (Ni, M12)3(V, M22), wherein M11 and M12 are one or more elements of Fe, Co, Cu, and Mn for Ni-site substitution, and wherein M21 is one or more elements of V, Mo, Nb, Fe, and Si for Ti-site substitution and M22 are one or more elements of—Ti, Mo, Nb, Fe, —and Si for V-site substitution.

8. The stainless steel alloy of claim 7, wherein said steel alloy has precipitates comprising one or more intermetallic phases of Ni3Mo, (Ni, M13)3(Mo, M23), and Mo-rich phase, wherein M13 is one or more elements of Fe, Co, Cu, and Mn of Ni-site substitution and M23 is one or more elements of V, Ti, Nb, Fe, and Si of Mo-site substitution.

9. The stainless steel alloy of claim 7, wherein making of said steel alloy comprising the steps of vacuum melting ingot, hot working, and hardening, and wherein said steel alloy has, in combination, hardness about HRC 53 and more, a ultimate tensile strength about 280 ksi and more, a yield strength about 230 ksi and more, a fatigue strength about 100 ksi and more at 10 million cycles, a fracture toughness about 55 ksi-sqrt(in) and more, a Charpy v-notch impact toughness energy about 10 ft-lb and more, and a corrosion resistance in salt spray test in 5% NaCl solution at 95° F. for more than 200 hours of test duration per ASTM Standard Test Procedure B 117-18, and wherein said steel alloy is a material for aircraft landing gears and structures.

10. The stainless steel alloy of claim 7, wherein said steel alloy has precipitates comprising carbides (Me)C, nitrides (Me)N, and carbo-nitrides Me(C, N), wherein Me is one or more of the elements Zr, Ti, Nb, and V.

11. The stainless steel alloy of claim 7, wherein said stainless steel alloy is hardened by age hardening, wherein said age hardening is performed more than one time.

12. A stainless steel alloy comprising, by weight %:
more than 14% and less than 20% nickel (Ni),
about 8.0%-less than 15.0% chromium (Cr),
about 3.0% max molybdenum (Mo),
more than 1.0% and less than 3.0% titanium (Ti),
more than 1.0% and less than 3.0% vanadium (V),
about 0%-1.0% manganese (Mn),
about 0%-1.0% copper (Cu),
about 0%-0.01% zirconium (Zr),
about 0%-1.0% niobium (Nb),
about 0%-0.03% carbon (C),
about 0%-0.03% nitrogen (N),
about 0%-0.01% sulphur (S),
about 0%-0.015% phosphorus (P),
about 0% and less than 0.1% aluminum (Al),
about 0%-0.01% boron (B),
about 0%-1.0% silicon (Si),
about 0%-0.01% magnesium (Mg),
about 0%-0.01% calcium (Ca),
about 0%-0.01% lanthanum (La),
about 0%-0.01% cerium (Ce),
and the balance is iron (Fe) and inevitable impurities, and wherein said stainless steel alloy has precipitates comprising a) one or more of Ni3Ti, Ni3(Ti, V), and (Ni, M11)3(Ti, M21) and b) one or more of Ni3V, Ni3(V, Ti), and (Ni, M12)3(V, M22), wherein M11 and M12 are one or more elements of Fe, Cu, and Mn for Ni-site substitution, and wherein M21 is one or more of V, Mo, Nb, Fe, and Si for Ti-site substitution and M22 are one or more elements of Ti, Mo, Nb, Fe and Si for V-site substitution.

13. The stainless steel alloy of claim 12, wherein making of said steel alloy comprising the steps of vacuum melting ingot, hot working, and hardening, and said steel alloy has, in combination, hardness about HRC 53 and more, a ultimate tensile strength about 280 ksi and more, a yield strength about 230 ksi and more, a fatigue strength about 100 ksi and more at 10 million cycles, a fracture toughness about 55 ksi-sqrt(in) and more, a Charpy v-notch impact toughness energy about 10 ft-lb and more, and a corrosion resistance in salt spray test in 5% NaCl solution at 95° F. for more than 200 hours of test duration per ASTM Standard Test Procedure B 117-18, and wherein said steel alloy is a material for aircraft landing gears and structures.

14. The stainless steel alloy of claim 12, wherein said steel alloy has precipitates comprising one or more intermetallic phases of Ni3Mo, (Ni, M13)3(Mo, M23), and Mo-rich phase, wherein M13 is one or more elements of Fe, Ce, Cu, and Mn of Ni-site substitution and M23 is one or more elements of V, Ti, Nb, Fe, and Si of Mo-site substitution.

15. The stainless steel alloy of claim 12, wherein said steel alloy has precipitates comprising carbides (Me)C, nitrides (Me)N, and carbo-nitrides Me(C, N), wherein Me is one or more of the elements Zr, Ti, Nb, and V.

16. The stainless steel alloy of claim 12, wherein said stainless steel alloy is hardened by age hardening, wherein said age hardening is performed more than one time.

\* \* \* \* \*